(12) United States Patent
Trappe et al.

(10) Patent No.: US 8,867,061 B2
(45) Date of Patent: Oct. 21, 2014

(54) METHOD AND SYSTEM FOR PRINTING FROM WEB APPLICATIONS, A CORRESPONDING COMPUTER PROGRAM AND A CORRESPONDING COMPUTER-READABLE STORAGE MEANS

(75) Inventors: Bernd Trappe, Berlin (DE); Danny Preussler, Berlin (DE)

(73) Assignee: Cortado AG, Berlin (DE)

( * ) Notice: Subject to any disclaimer, the term of this patent is extended or adjusted under 35 U.S.C. 154(b) by 1213 days.

(21) Appl. No.: 11/696,780

(22) Filed: Apr. 5, 2007

(65) Prior Publication Data

US 2007/0291302 A1    Dec. 20, 2007

Related U.S. Application Data

(60) Provisional application No. 60/745,672, filed on Apr. 26, 2006.

(30) Foreign Application Priority Data

Apr. 12, 2006  (DE) .......................... 10 2006 017 761
Jul. 3, 2006   (DE) .......................... 10 2006 031 211

(51) Int. Cl.
     *G06F 3/12*        (2006.01)
(52) U.S. Cl.
     CPC ............ *G06F 3/1247* (2013.01); *G06F 3/1253* (2013.01); *G06F 3/1289* (2013.01); *G06F 3/1206* (2013.01); *G06F 3/1284* (2013.01); *G06F 3/1205* (2013.01); *G06F 3/1292* (2013.01)
     USPC ........................... 358/1.15; 709/203; 715/740
(58) Field of Classification Search
     USPC .................................. 358/1.1, 1.15; 709/203
     See application file for complete search history.

(56) References Cited

U.S. PATENT DOCUMENTS 7,075,670 B1 *  7/2006  Koga ........................... 358/1.15
7,321,902 B2 *  1/2008  Simpson et al. ...................... 1/1

(Continued)

FOREIGN PATENT DOCUMENTS

EP      1422609 A2      5/2004
JP      2001-022863     1/2001

(Continued)

OTHER PUBLICATIONS

Hideo Taniguchi, "7.1 Web Basic Technology (c) HTTP Header, Distributed Processing"; Sep. 15, 2005, First Edition, p. 181, Ohmsha, Ltd., Japan.

*Primary Examiner* — King Poon
*Assistant Examiner* — Lawrence Wills
(74) *Attorney, Agent, or Firm* — Norris McLaughlin & Marcus, P.A.

(57) ABSTRACT

A method and a system for printing from web applications, as well as a corresponding computer program and a corresponding computer-readable storage means, are described. The method and system are particularly useful for improving the print functionality of web applications; e.g., by enabling printout of additional formats. It is proposed to provide on web pages a print option that can be controlled via data input means of a terminal. Activation of the print option causes a server executing the web application to send the data to be printed to a designated print server to start a print process on the print server, and to send the data generated by the print process from the print server to a network printer or to the terminal.

23 Claims, 4 Drawing Sheets

(56) References Cited

U.S. PATENT DOCUMENTS

| | | |
|---|---|---|
| 7,382,473 B2 | 6/2008 | Chohsa et al. |
| 8,553,268 B1* | 10/2013 | Hasegawa .................... 358/1.15 |
| 2002/0122201 A1 | 9/2002 | Haraguchi et al. |
| 2002/0126306 A1 | 9/2002 | Chohsa et al. |
| 2002/0184305 A1 | 12/2002 | Simpson et al. |
| 2003/0009672 A1* | 1/2003 | Goodman .................... 713/176 |
| 2003/0197892 A1 | 10/2003 | Fukuoh |
| 2004/0001217 A1* | 1/2004 | Wu ............................. 358/1.15 |
| 2005/0099647 A1* | 5/2005 | Aichi .......................... 358/1.15 |
| 2005/0262437 A1* | 11/2005 | Patterson et al. ............. 715/517 |

FOREIGN PATENT DOCUMENTS

| | | |
|---|---|---|
| JP | 2001-156970 | 8/2001 |
| JP | 2002163597 A | 6/2002 |
| JP | 2002264440 A | 9/2002 |
| JP | 2003-114773 | 4/2003 |
| JP | 2003-280832 | 10/2003 |
| JP | 2004157601 A | 6/2004 |
| JP | 2005050046 A | 2/2005 |
| JP | 2005-141448 | 6/2005 |
| JP | 2006053716 A | 2/2006 |
| JP | 2006127007 A | 5/2006 |

* cited by examiner

METHOD AND SYSTEM FOR PRINTING FROM WEB APPLICATIONS, A CORRESPONDING COMPUTER PROGRAM AND A CORRESPONDING COMPUTER-READABLE STORAGE MEANS

The invention relates to a method and system for printing from web applications, as well as a corresponding computer program and a corresponding computer-readable storage means, which may be used in particular for improving the print functionality of web applications, e.g. by enabling printout of additional formats.

Conventional solutions for printing from web applications use the print functionality of the web browser installed on the client computer. Content is typically printed from web pages by activating the print button in the menu bar of the web browser. This opens a printer object including a printer driver installed on the client computer, which is then used to print the web page.

Another known solution provides a "print button" that is integrated in a web page. When such a "print button" is activated, a new HTML page containing a specially prepared representation of the content selected for printout is typically created on the server on which the application is running—hereafter called the application server. In particular, annoying elements, such as the "print button", can be removed from the representation. The HTML page created for printout in this manner is transferred to the client computer and thereafter printed using the print functionality of the web browser. Here, too, printing is performed by using the print functionality of the web browser.

Furthermore, there are solutions whereby activation of the print button directly activates the default printer installed on the client computer and initiates printing on the client computer. In this case, the process is similar to the above conventional solutions in that the displayed HTML page is outputted directly on a printer installed at the client.

The particular disadvantage of all the solutions described above is that direct printing from web applications is always limited to HTML documents. Although web browsers that enable printout from, e.g., .pdf documents or Office documents (such as Microsoft Word, Excel, PowerPoint) from the web browser exist, they always require the corresponding application or an application compatible with the corresponding application to be resident on the client computer. Printing is then not performed directly from the browser, but rather from the application called for display.

It is therefore an object of the present invention to provide a method and a system for printing from web applications, as well as a corresponding computer program and a corresponding computer-readable storage means, which obviate the aforedescribed disadvantage and more particularly enable web applications to be printed in any format.

The invention is solved by the features recited in claims 1, 15, 20, and 21. Advantageous embodiments of the invention are recited in the dependent claims.

According to one advantageous embodiment of the invention, any format can be printed from web applications using the method of the invention. This is achieved because a web application displayed in a web browser provides a print option that can be activated by the user of the terminal. Such a print option can be, for example, a print button integrated in the web page, preferably a conventional button for a web form. (The print option is thus not integrated in the menu of the web browser.) When the user activates this print button, signals are sent to the server on which the web application is running (application server) that cause the application server to send the data to be printed to a print server. This print server can be specified by the terminal that initiated printing or set by the application server. On the print server, a print process is now started and the data created by the print process is sent to the terminal that initiated printing, where the data are printed or simply displayed on the display of the terminal as a page view. Preferably, the data generated by the print process is sent to the terminal as a data stream (streamed). In a preferred embodiment of the method of the invention, printing is performed by a printer locally connected to the terminal. The method of the invention is particularly advantageous for mobile terminals. Alternatively or in parallel, the data generated by the print process can also be sent from the print server to a network printer or to a fax printer. While a network printer creates a "real" printout of a document, e.g., a printout on paper or other carrier material, a fax printer sends the document as fax.

In another advantageous embodiment of the method of the invention, input means for controlling the printout may be provided after the print option has been activated on the terminal. Preferably, this may be a menu enabling selection of the printer on which contents can be printed and/or selection of the configuration of this printer.

In another advantageous embodiment of the method of the invention, the input means for controlling the printout can be provided by a computer program installed on the terminal. In a preferred solution, this computer program is started by the browser. This is performed by returning special data from the application server to the terminal, after activation of the print button has been signaled to the application server, that cause the browser installed on the terminal to start the computer program for providing the input means.

According to a preferred embodiment of the method of the invention, the program for providing the input means is installed as an application responsible for the aforementioned MIME type in the form of a plug-in for the browser. This is particularly advantageous because there is no need for a special interface between the browser and the computer program for providing the input means. The browser's standard functionality for handling plug-ins is used. More particular, the data returned from the application server to the terminal have a MIME type (MIME=Multipurpose Internet Mail Extensions), which causes the browser to start the computer program implemented as a plug-in for providing the input means. The entire communication between the application server and the terminal as well as between the browser and the computer program for providing the input means is thus based on web standards. The complexity of the installation required for integrating the print functionality in the web application software is therefore minimal.

After the computer program has been started and the input means has been provided on the user interface of the terminal, the user can enter information for controlling the print process via this input means. Advantageously, the user can enter information about the printer used for printing and/or the address of the print server to which the application server will send the data to be printed. Furthermore, other information available on the terminal, e.g., location, connection type, terminal identification or operating system, can also be detected with this computer program.

By transmitting the location to the print server, the print server can offer the user those printers for printing the data to be printed that are located near the installation site. This solution enables flexible, location-dependent printing.

The data about the installation sites can be entered, for example, manually in the input means (postal code, department or branch office of a company, subsidiary of a business operation, or the like), and can be provided, in particular with mobile terminals, as cell information of a mobile network operator or by a GPS module integrated in the terminal (geographic coordinates).

In a preferred embodiment, after this information has been entered, the terminal sends at least a portion of the input to the application server. If the data are to be printed on a printer locally connected to the terminal, then the data sent to the application server must also contain information about the terminal. The data sent by the terminal are evaluated on the application server, for example, to determine the print server to which the data are to be sent for printing. Those data required by the print server to execute printing in the desired manner, such as, for example, the address of the terminal or the destination printer, are sent to the print server together with the data to be printed.

According to an advantageous embodiment of the invention, the data are then sent to the application server via a standard web path, e.g. via HTTP upload.

According to another advantageous embodiment of the method of the invention, the data to be sent from the application server to the print server are sent to the print server via e-mail. In a preferred embodiment, the data to be printed are appended to the e-mail as an attachment.

A system for printing from web applications according to the invention includes at least one server, on which the web application is running (application server); at least one print server; and at least one terminal cooperating with the at least one application server and the at least one print server. The at least one application server, the at least one print server, and the at least one terminal are at least temporarily connected with each other by means for data transmission. The system is furthermore configured for printing from web applications to cause a web application called in the browser of the at least one terminal to provide a print option that can be controlled via data input means of at least one terminal; to cause the at least one application server to send data to be printed to a designated print server following activation of the print option; to start a print process on the designated print server; and to send the data generated by the print process from the print server to a network printer, to a fax printer and/or to the terminal, whereby the data transmission is preferably in form of a data stream.

According to a preferred embodiment of the system of the invention, the at least one application server and the at least one print server are integrated in a computer network, such as a Local Area Network (LAN), a Metropolitan Area Network (MAN), a Wide Area Network (WAN), or the Internet.

In another particularly advantageous embodiment, the at least one terminal is a mobile terminal. The mobile terminal can be, for example:
a mobile telephone
a handheld device
a Personal Digital Assistant (PDA),
a mobile terminal cooperating with a message signaling service
a Pocket PC
a Notebook.

A computer program for printing from web applications enables a data processing system, after the computer program has been loaded into the computer memory, to execute a print method according to the invention, wherein a web application started in the browser of an terminal provides a print option that can be controlled via data input means of the terminal, wherein upon activation of the print option, a server on which the web application is running is prompted to send data to be printed to a designated print server, and wherein a print process is started on the print server and the data generated by the print process are sent from the print server to a network printer, to a fax printer and/or to the terminal.

The computer program includes several modules, whereby
at least one first module is installed on the application server,
at least one second module is installed on the terminal, and
at least one third module is installed on the print server.

Such computer programs may be provided, for example, for downloading (for a fee or free of charge, freely accessible or password-protected) in a data or communication network. The provided computer programs can be used with a method whereby a computer program of claim 20 is downloaded from an electronic data network such as, for example, the Internet, to a data processing system connected to the data network.

For performing the printing method according to the invention, a computer-readable storage means is used, on which a program is stored that enables a computer, after the program has been loaded to the storage means of the computer, to execute a method for printing from web applications, wherein a web application called in a browser of an terminal provides a print option via a data input means of the terminal, wherein upon activation of the print option a server on which the web application is running is prompted to send data to be printed to a designated print server, and wherein a print process is started on the print server; a print process is started on the print server, and the data generated by the print process are sent from the print server to a network printer, to a fax printer and/or to the terminal.

The invention thus provides a method for integrating print output into web applications for client computers, particularly for mobile devices. Advantageously, with the invention there is no need to create on the mobile device individual software specific for the web application. Instead, a standard solution is provided for the client terminal (the mobile device) that every software provider that produces a web application can use to expand the web application to include printing. The application controlling the communication between terminal, the application server and the print server needs only be adapted on the side of the application server.

An exemplary embodiment of the invention will now be described in more detail with reference to the appended figures, which show in.

Figure 1:
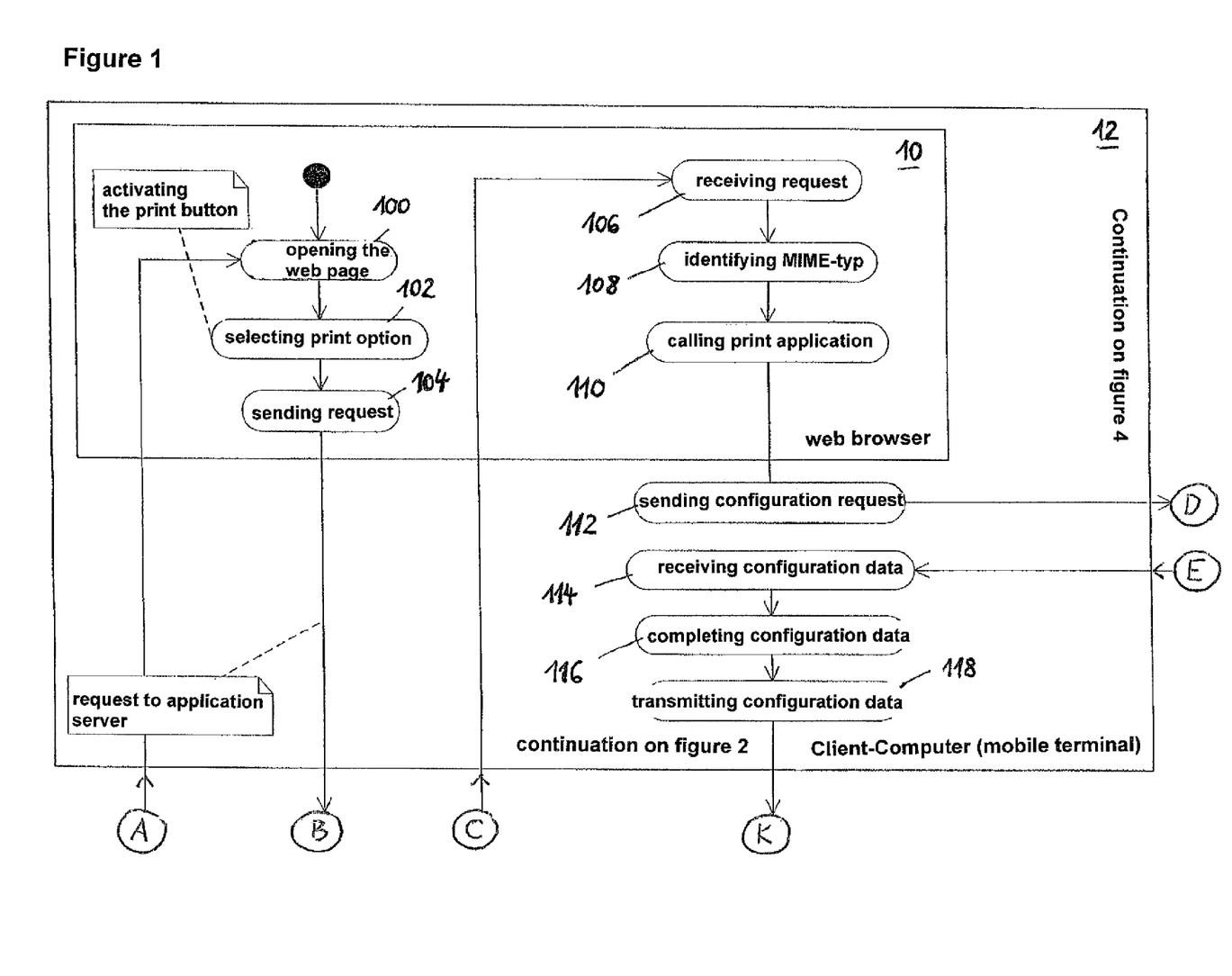
FIGS. 1-4 Data flows and process steps executed during printing from web applications.
Figure 2:
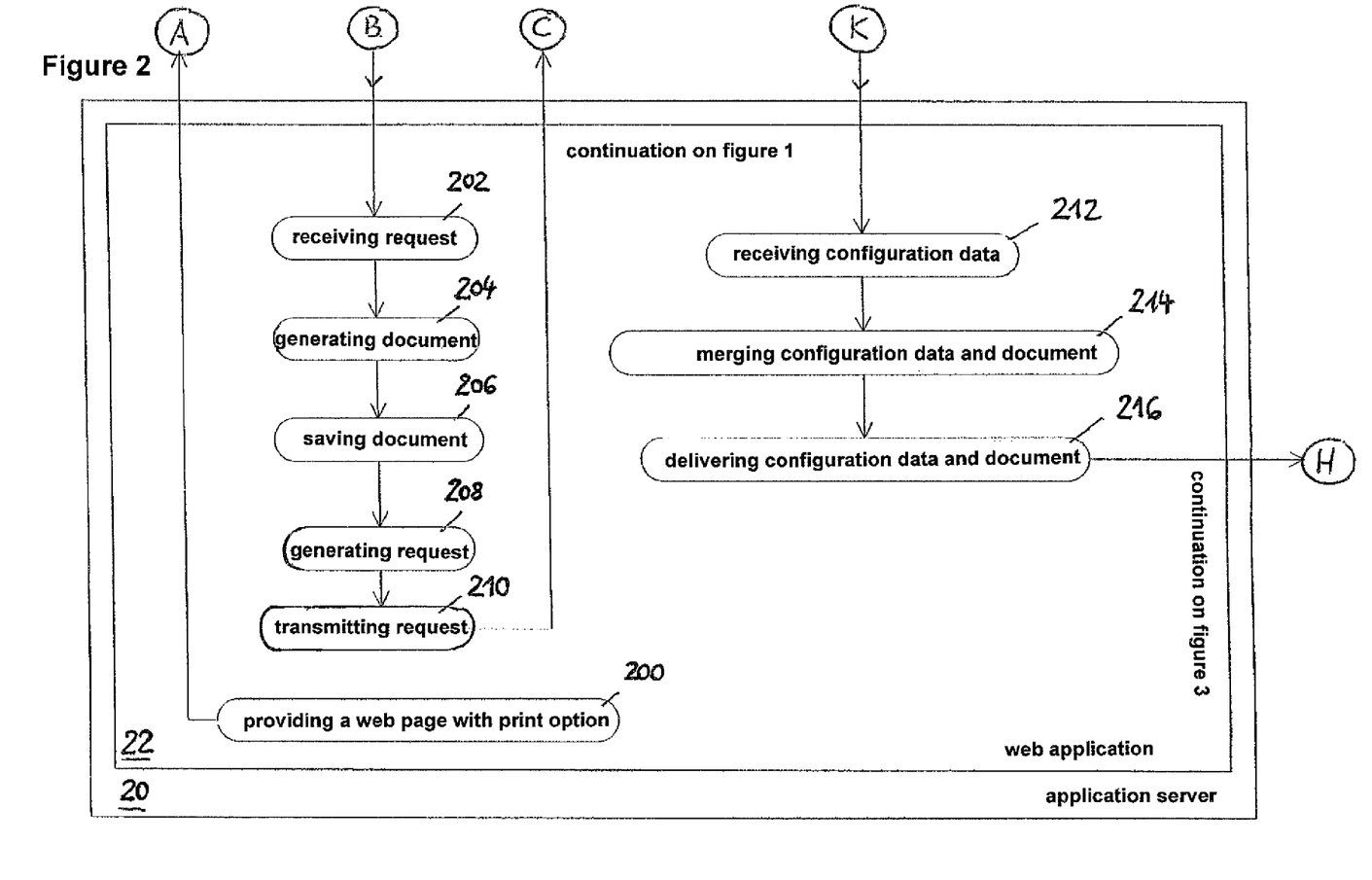
Figure 3:
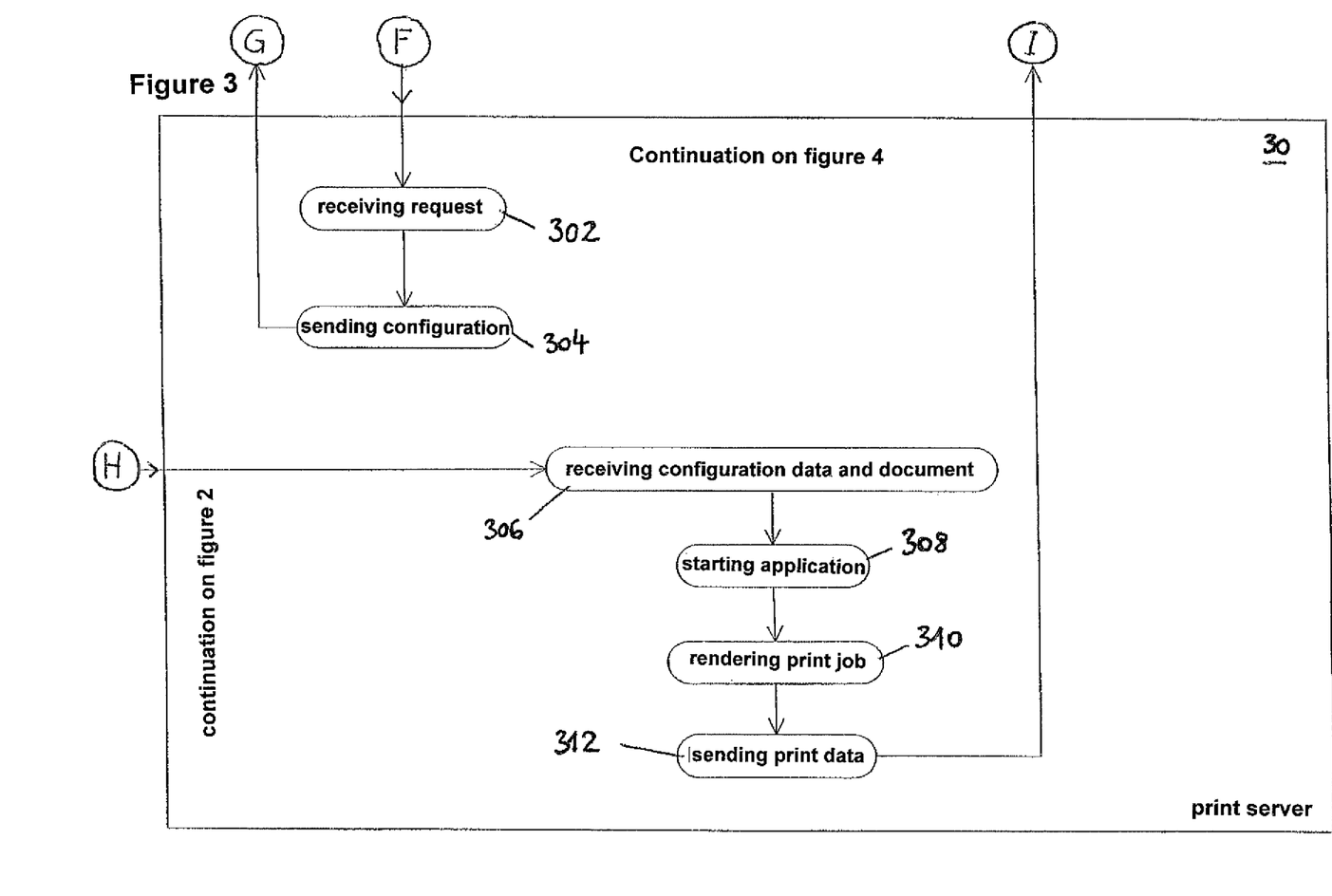
Figure 4:
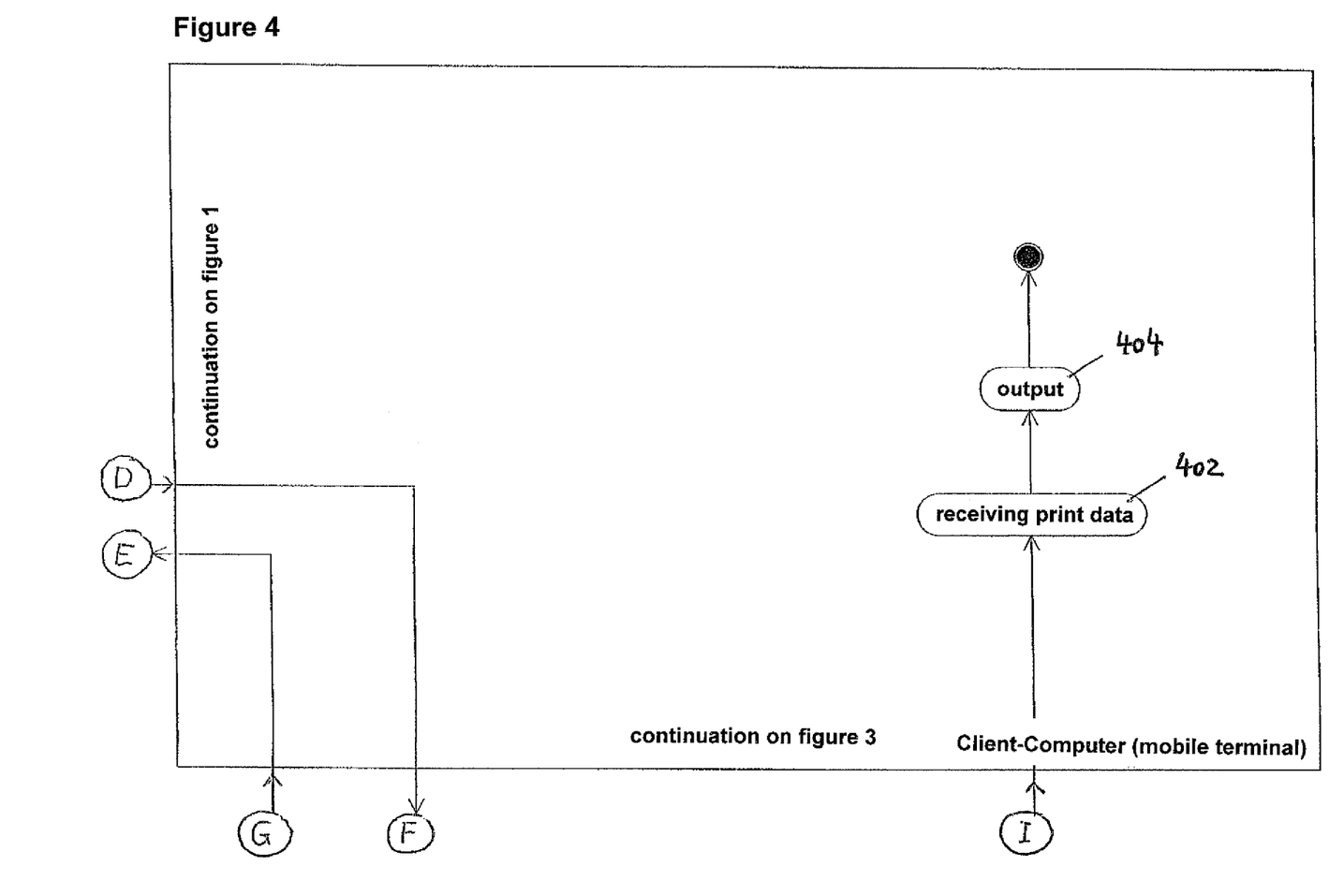

A particular exemplary embodiment of the invention will now be described in more detail. The exemplary embodiment described below is directed to printout of contents from the web pages of a service provider by a printer locally connected to the terminal 12. However, the invention is not limited to this specific exemplary embodiment. Printing can also be performed by a network printer or by a fax printer connected with the print server 30.

At a first step 200, the service provider provides applications 22 that can be accessed via a web browser 10. This may include, for example, filling in input masks, etc. The entire application logic is located on an application server 20. For user communication, only web pages are generated. These are used by the terminal 12 of a user, for example a mobile terminal, via the terminal's browser functionality.

According to the invention, these applications 22 can now be expanded to include a print option.

In a specific exemplary embodiment, application-independent software is installed on the terminal 12 which provides communication between terminal 12 and the print server 30, and which is mediated only by the application server 20.

Because the user uses the application 22 only via the browser 10, no further (application-dependent) software from the provider is installed on the client computer or the mobile terminal 12.

With conventional solutions, direct client-side communication from the application 22 with a print program installed on the client terminal 12 is not possible. With conventional solutions, the service provider would have to design and/or adapt as well as install on all client terminals 12 corresponding special, application-specific software. The present invention makes this unnecessary.

Only the information entered in the browser 10, e.g. in masks, by the user is available on the terminal 12. The actual document (to be printed) is often generated on the server side and is not available on the terminal 12.

The browser 10 on the terminal 12 represents the only interface of the terminal 12 for data exchange during printing according to the invention.

Each web page to be displayed is typically identified via the standardized method of the MIME type. If the web browser 10 is not aware of the particular MIME type when opening a web page, the web browser 10 searches for an installed plug-in capable of displaying this MIME type. This is a standard method of extending the functionality of a browser 10 to display special web pages (e.g., Flash, JAVA Applets, etc.). This method is used by the invention for communicating the computer program for providing the input means with the browser 10. The computer program for providing the input means therefore automatically registers itself in the browser 10 as such a plug-in for a specially defined MIME type.

The service provider extends the application 22 (on the web pages) with a print button, wherein activation of the print button triggers the server-side creation of a file, e.g. a document, with exactly these specially defined MIME types.

After opening a web page, the user can use the print button integrated in the web page, at a first step 100. When the user activates the print button, at step 102, a corresponding request is sent to the application server 20, at step 104, and received by the application server 20, at step 202. In a following step 204, the data to be printed (document) is processed on the server side, saved at a particular storage location, at step 206, and at the ensuing step 208, a file with the specially defined format is created and sent to the terminal 12, at step 210. This file includes, among other things, information about the location where the document to be printed has been saved. This information can include, for example, a URL (=Uniform Resource Locator) that refers to the particular storage location of the document to be printed. Therefore, after activation of the print button at step 102, the server application, among other things, saves all information about the contents to be printed (step 206), creates a link to the information (session management), and sends this link together with the MIME type to the terminal 12 (step 210). The browser 10 receives this information, at step 106, identifies the MIME type of the file, at step 108, and starts, at the next step 110, the computer program that provides the input means, because the browser 10 itself is not able to display the pages of the specially defined MIME type. Instead of displaying a web page, the input means are now provided, which enable the configuration to be determined, printers to be selected, etc. Preferably, the input means are in form of a print menu. At the same time, the computer program that provides the input means establishes a connection to the print server 30 to which the application server 20 is to send the data to be printed and sends a configuration request to the print server 30, at step 112. After the print server 30 has received the configuration request, at step 302, it sends in a next step 304 information about the configuration to the terminal 12, which receives the information, at step 114. Via this connection between terminal 12 and print server 30, the computer program that provides the input means thus receives, for example, information about the configuration of the available printers.

After the configuration data have been received by the terminal 12, at step 114, the configuration data are, at a next step 116, augmented by additional information, such as, for example, information about formatting the printout, information about the selected printer, and the like, that were entered via the print menu. The information determined from the print menu is then returned to the application server 20, at step 118. The exact location where the document to be printed is saved is conveyed to the client computer or mobile terminal 12 when the MIME-type document was sent as a URL (step 210).

In an exemplary embodiment of the invention, the collected information entered via the print menu is sent to the application server 20 by a standard web path (HTTP upload), much like as if, e.g., a user would send a form from the browser 10. The internet protocol to the application server 20 is then also exclusively used for the return path. As a unique feature of the invention, all information obtainable on the terminal 12 can be sent to the application server 20, such as e.g. location, connection type, and interface availability.

In a preferred embodiment, the computer program for providing the input means thus communicates with two opposite terminals, the application server 20 and the print server 30, whereby communication with the application server 20 preferably takes place only via the browser 10. Any suitable communication link can be used for communicating with the print server 30.

In an exemplary embodiment of the invention, the application server 20 receives the information, at step 212, and generates, at a next step 214, an e-mail that contains the configuration data and includes the previously generated document with the data to be printed as an attachment, and initiates printing.

In an exemplary embodiment of the invention, this takes place at step 216 by sending the e-mail to the print server 30. The information required, such as, for example, destination of the e-mail and the like, is also being sent during the upload, at step 118/212, from the terminal 12 to the application server 20 and is transferred from the application server 20 to the print server 30 as a parameter in the form of an e-mail with all print information (step 216/306). Instead of sending the parameters and print information by e-mail, of course every other type of transfer, e.g. TCP/IP-based communication, can also be used for data transfer.

The print server starts the printout and transfers the print data to the terminal, whereby the transfer occurs preferably as a data stream.

In detail, the process on the print server proceeds as follows: the print server receives, at step 306, the e-mail sent by the application server 20 with the data to be printed and with the configuration data, starts at step 308 the application associated with the data to be printed (e.g., the application MS Word for a *.doc document), renders the print job at step 310, and then sends the print data to the terminal 12, at step 312. At step 402, the terminal 12 receives the data and, at step 404, sends the data to a printer that is locally connected to terminal 12.

The embodiment of the invention is not limited to the aforedescribed preferred exemplary embodiments. Instead, a number of variants can be envisioned which make use of the system and the method of to the invention even when employing fundamentally differently designed embodiments.

What is claimed:

1. A method for printing from a web application, said web application being started in a browser of a terminal, being executed on a first server, generating, in response to a user input into the terminal, a content and providing, in the browser, a web page containing a content, the web application further providing a print option for printing the content, the print option being operable via input means of the terminal, the terminal having installed a plug-in, which is called from the browser in response of receipt of data in a pre-defined format, the method comprising the steps of:

causing, by activating the print option, the web application to send data in the pre-defined format to the terminal, calling the plug-in in response of the receipt of the data in the pre-defined format, accessing, by means of the plug-in, a second server to obtain configuration data, describing a configuration of the second server, providing, by the plug-in on the terminal, a menu for controlling the printing, providing the first server with at least a part of the configuration data and with data inputted into the menu, causing the first server to send data of the content to be printed to the second server based on the configuration data and on the data inputted into the menu, starting a print process on the second server for generating print data, and sending the print data from the second server to at least one of a network printer, a fax printer and the terminal.

2. The method of claim 1, wherein the first server is an application server.

3. The method of claim 1, wherein the second server is a designated print server.

4. The method of claim 1, wherein the data in the pre-defined format have a MIME type (MIME=Multipurpose Internet Mail Extensions).

5. The method of claim 1, wherein the plug-in communicates with the first server via a first communication link and wherein the plug-in communicates with the second server via a second communication link.

6. The method of claim 1, and further comprising the steps of sending the print data from the terminal to a printer locally connected to the terminal and printing the print data on the locally connected printer.

7. The method of claim 1, wherein the print data are sent to the network printer, to the fax printer or to the terminal as a data stream.

8. The method of claim 1, wherein the data sent from the first server to the terminal comprise information describing at least one of
 a storage location of the data to be printed, and
 a MIME type (MIME=Multipurpose Internet Mail Extensions) of the print data sent to the terminal.

9. The method of claim 1, wherein at least one portion of the data entered via the menus is sent to the first server, and wherein the at least one portion of the data sent to the first server together with the data of the content to be printed is sent from the first server to the second server.

10. The method of claim 9, wherein the data entered or detected via the provided menu comprise
 information about the printer on which the print data are to be printed, and
 an address of the designated print server to which the at least one portion of the data sent to the application server together with the data of the content to be printed is sent.

11. The method of claim 9, wherein the at least one portion of the data entered via the menu is sent to the first server by using the browser.

12. The method of claim 11, wherein the at least one portion of the data entered via the menu is sent to the first server as an HTTP request.

13. The method of claim 9, wherein the at least one portion of the data sent to the first server together with the data of the content to be printed is sent to the second server via a conventional web transmission link.

14. A system for printing from a web application, comprising at least one first server executing a web application, at least one second server, at least one terminal cooperating with the at least one first server and with the at least one second server, the at least one terminal has at least one plug-in installed on it, which is called from the browser in response of receipt of data in a pre-defined format, wherein the web application is called in a browser on the at least one terminal, generates, in response to user input into the terminal, a content and provides, in the browser, a web page containing a content and further provides a print option for printing the content, the print option being controllable via data input means provided on the at least one terminal, wherein activation of the print option causes the web application to send data in the pre-defined format to the at least one terminal, the plug-in is called in response of the receipt of the data in the pre-defined format, the at least one terminal accesses, by means of the plug-in, the at least one second server to obtain configuration data, describing a configuration of the at least one second server, the plug-in provides, on the at least one terminal, a menu for controlling the printing, at least a part of the configuration data and data inputted into the menu are provided the at least one first server, causing the at least one first server to send data of the content to be printed to the at least one second server based on the configuration data and on the data inputted into the menu, a print process is started on the at least one second server for generating print data, and the print data is sent from the at least one second server to at least one of a network printer, a fax printer and the at least one terminal.

15. The system of claim 14, wherein the first server is an application server.

16. The system of claim 14, wherein the second server is a designated print server.

17. The system of claim 14, wherein the first server and the second server are connected to a computer network.

18. The system of claim 17, wherein the computer network includes at least one of
 a Local Area Network (LAN),
 a Metropolitan Area Network (MAN),
 a Wide Area Network (WAN),
 the internet, and
 a wired or wireless network.

19. The system of claim 14, wherein the at least one terminal is a mobile terminal.

20. The system of claim 19, wherein the mobile terminal is selected from the group consisting of
- a mobile telephone,
- a handheld device,
- a Personal Digital Assistant (PDA),
- a mobile terminal cooperating with a message signaling service,
- a Pocket PC, and
- a Notebook.

21. A non-transitory computer program embodied in at least one first module installed on a first server, at least one second module installed on a terminal and at least one third module installed on a second server, wherein the at least one second module comprises a plug-in, which is called from the browser in response of receipt of data in a pre-defined format, wherein the computer program enables the terminal to execute in cooperation with the first and second server a method for printing from a web application, the method comprising the steps of:
- starting a web application in a browser of the terminal, said web application executing on the first server, generating, in response to user input into the terminal, a content and providing, in the browser, a web page containing a content,
- the web application further providing a print option for printing the content,
- the print option being operable via input means of the terminal,
- by activating the print option, causing the web application to send data in the pre-defined format to the terminal,
- calling the plug-in in response of the receipt of the data in the pre-defined format,
- accessing, by means of the plug-in, the second server to obtain configuration data, describing a configuration of the second server,
- providing, by the plug-in on the terminal, a menu for controlling the printing,
- providing the first server with at least a part of the configuration data and with data inputted into the menu, causing the first server to send data of the content to be printed to the second server based on the configuration data and on the data inputted into the menu,
- starting a print process on the second server for generating print data, and
- sending the print data from the second server to at least one of a network printer, a fax printer and the terminal.

22. The computer program of claim 21, wherein the computer program is downloaded from an electronic data network to a data processing system connected to the electronic data network.

23. A non-transitory computer-readable storage medium on which a computer program is stored which, after at least one first module of the computer program is loaded in a memory of a first server, at least one second module of the computer program is loaded in a memory of a terminal, at least one third module of the computer program is loaded in a memory of a second server, enables the terminal to execute in cooperation with the first and second server a method for printing from a web application, wherein the at least one second module comprises a plug-in, which is called from the browser in response of receipt of data in a pre-defined format, the method comprising the steps of:
- starting a web application in a browser of the terminal, said web application executing on the first server, generating, in response to user input into the terminal, a content and providing in the browser a web page containing the content,
- the web application further providing a print option for printing the content,
- the print option being operable via input means of the terminal,
- by activating the print option, causing the web application to send data in the pre-defined format to the terminal,
- calling the plug-in in response of the receipt of the data in the pre-defined format,
- accessing, by means of the plug-in, the second server to obtain configuration data,
- describing a configuration of the second server,
- providing, by the plug-in on the terminal, a menu for controlling the printing,
- providing the first server with at least a part of the configuration data and with data inputted into the menu, causing the first server to send data of the content to be printed to the second server based on the configuration data and on the data inputted into the menu,
- starting a print process on the second server for generating print data, and
- sending the print data from the second server to at least one of a network printer, a fax printer and the terminal.

* * * * *